United States Patent
Hoffman

[15] 3,646,356
[45] Feb. 29, 1972

[54] CONTROL SYSTEM FOR STARTING UP AND SYNCHRONIZING A PLURALITY OF GENERATORS AND METHOD OF OPERATION

[72] Inventor: George M. Hoffman, Springfield, Ohio
[73] Assignee: White Motor Corporation, Cleveland, Ohio
[22] Filed: Dec. 17, 1970
[21] Appl. No.: 99,162

[52] U.S. Cl. .................................................. 307/87, 307/57
[51] Int. Cl. .................................................... H02j 1/00
[58] Field of Search .................... 307/56, 57, 58, 85, 86, 59, 307/87, 149, 150, 43, 51; 235/151 F; 317/60

[56] References Cited

UNITED STATES PATENTS 3,235,743   2/1966   Ryerson et al. ........................ 307/87 X
3,489,914   1/1970   Taylor .................................... 307/87 X Primary Examiner—Herman J. Hohauser
Attorney—Watts, Hoffman, Fisher & Heinke

[57] ABSTRACT

An electrical control system for starting up and synchronizing a plurality of alternating current generators, such as emergency power generators, and a method of operation thereof. The plurality of generators are simultaneously connected to a common busline, and motive power is simultaneously applied to each of the generators. As the generators begin to supply power, synchronizing circuits monitor the power developed by each generator and cause the generators to maintain substantially identical speeds as the generators are brought up to a normal operating speed. Accordingly, when the speed of the generators reaches the normal operating speed, the generators are in synchronization. The common busline may then be coupled to the main voltage supply line to thereby energize the main supply line.

20 Claims, 2 Drawing Figures

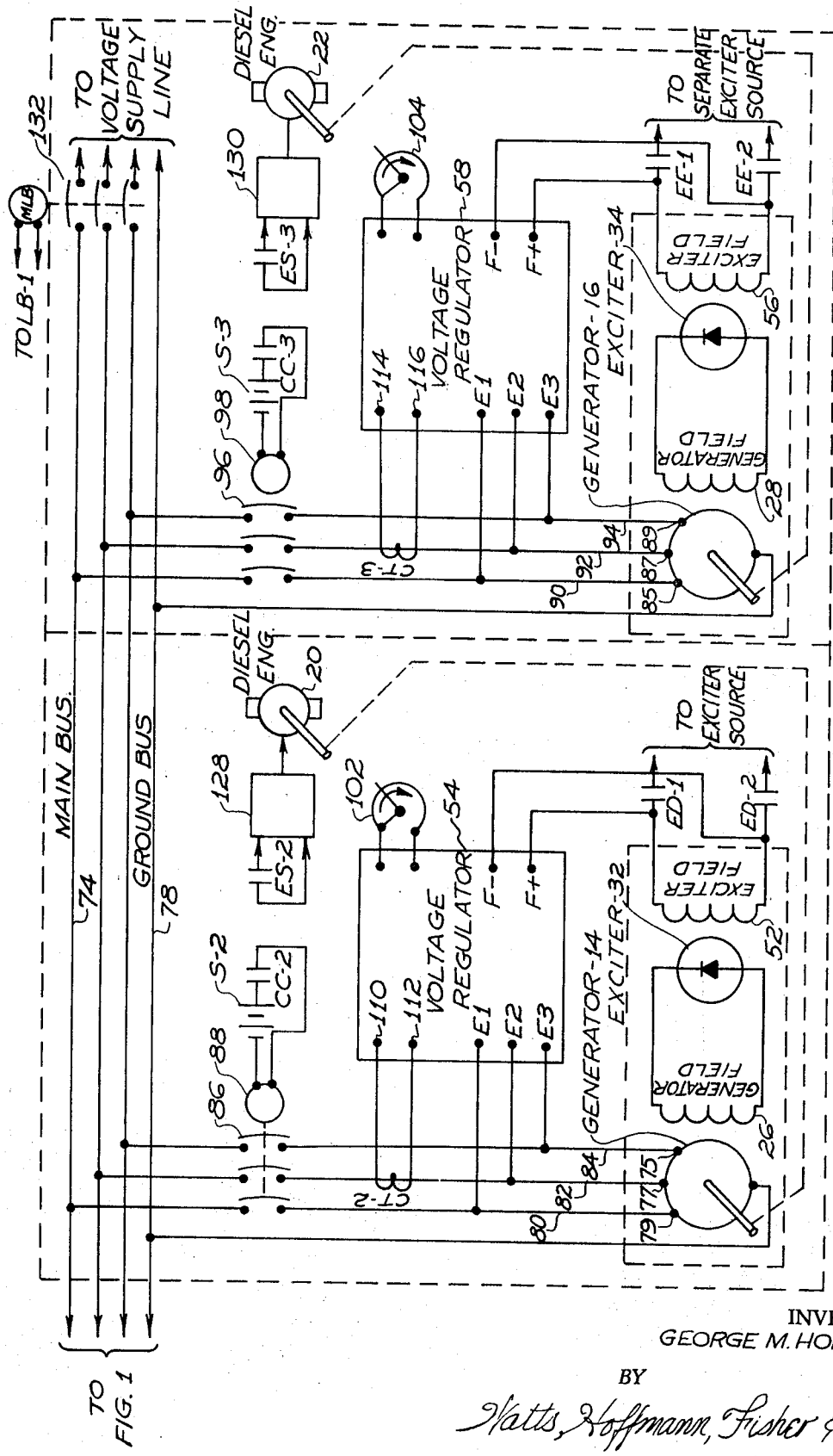

CONTROL SYSTEM FOR STARTING UP AND SYNCHRONIZING A PLURALITY OF GENERATORS AND METHOD OF OPERATION

CROSS-REFERENCES TO A RELATED PATENT

U.S. Letters Pat. No. 2,393,025 to W. A. Darr, entitled, "Control System," and issued on Jan. 15, 1946.

BACKGROUND OF THE INVENTION

This invention pertains to the art of control systems for controlling the operation of a plurality of power generators, and more particularly, to a control system for starting up and synchronizing a plurality of alternating current power generators.

In the operation of power-generating systems, and in particular, in the operation of emergency standby power-generating systems, it is frequently desirable to start up a plurality of generators and apply these generators to a main supply line. This startup operation is normally carried out by starting up one of the plurality of generators and allowing the speed of this generator to attain a normal operating speed. A second generator is then started up. When the speed of the second generator approaches the normal operating speed, a synchronizing control circuit is actuated in order to control the speed of the second generator in order to synchronize the speed of the second generator with the speed of the first generator. Then, a third generator is started up and the same procedure is carried out in order to synchronize the speed of the third generator with the speed of the first and second generators. If the generating system includes more than three generators, the remaining generators are sequentially started up and the speed of each is synchronized with the speed of the operating generators. With these systems it has not been possible to start up and synchronize a plurality of generators in less than about 1 minute. An example of a control circuit for synchronizing a plurality of generators is disclosed in the above-referenced U.S. Pat. No. 2,393,025.

The sequential starting up and synchronizing of a plurality of generators is normally a satisfactory procedure. Such a system is, however, totally inadequate if it is necessary to develop electrical power within a very short period of time, as is the case with an emergency power-generating system.

In the operation of certain electrical equipment, such as electrical equipment used for sustaining human life, or in aircraft communication and navigational equipment, it is necessary that emergency power-generating systems be available to supply the required power almost immediately. For example, even a lapse of the normal 60 seconds in starting up a generating system might well create a hazardous situation.

It is therefore an object of the present invention to provide a generating system including a plurality of power generators which may be started up and synchronized within a very short period of time, i.e., on the order of 15 seconds.

Another object of the present invention is to provide a generating system in which a plurality of electrical power generators are automatically started and brought up to a normal operating speed.

Another object of the present invention is to provide a generating system having a plurality of generators which are simultaneously started up and are synchronized as the generators are brought up to normal operating speeds.

A further object of the present invention is to provide a generating system having three or more generators which are simultaneously started up and are maintained at identical speeds as the speed of the generators are brought up to a normal operating speed.

A still further object of the present invention is to provide a power-generating system which can be brought up to full capacity within a very short period of time, on the order of 15 seconds, of the loss of power on the main voltage supply lines.

Another object of the present invention is to provide a control system for a power-generating system in which a plurality of alternating current generators are connected in parallel on a main voltage supply within an extremely short period of time.

A still further object of the present invention is to provide a power-generating system in which the speeds of a plurality of generators are matched or synchronized as the speed of the generators buildup to the normal operating speed.

Another object of the present invention is to provide a method of starting up and synchronizing a plurality of generators in a power-generating system.

SUMMARY OF THE INVENTION

The present invention is directed toward a generating system including a plurality of generators, and method of operation thereof, thereby overcoming the noted serious disadvantages, and others, of previously known systems.

In accordance with one aspect of the present invention, there is provided a power generating system comprising a plurality of engine-driven, electrical generators each having a field winding, and an electrical control circuit for starting up and synchronizing the generators. The control circuit includes switching circuits for simultaneously connecting all of the generators to a common busline, starting circuits for simultaneously starting each of the engines which drive the generators, and a synchronizing circuit for matching or synchronizing the speeds of the generators as the speed of the generators buildup to a normal operating speed.

In accordance with another aspect of the present invention, the synchronizing circuit includes a separate source of excitation and a plurality of voltage regulator circuits and switching circuits for transferring the field windings of the electrical generators from the excitation source to the voltage regulator circuits as the generators begin to generate electrical power. Thus, the plurality of generators are maintained in synchronization as the speed of the generators buildup to the normal operating speed.

In accordance with another aspect of the present invention there is provided a method of starting up a power-generating system. The power-generating system includes a control system and a plurality of engine-driven power generators, each including a field winding. The control system includes a voltage regulator circuit for each one of the generators and a field excitation source. The method comprises the steps of substantially simultaneously electrically connecting the output terminals of each of the plurality of generators to a common busline, substantially simultaneously energizing the field windings of each of the plurality of generators with the field excitation source, electrically applying a control signal having a value representative of a generated signal to each generator field winding with the voltage regulators, electrically disconnecting the field excitation source from each field winding, and electrically connecting the common busline to a voltage supply line to thereby energize the supply line.

BRIEF DESCRIPTION OF THE DRAWINGS

These and other objects and advantages of the invention will become apparent from the following description of a preferred embodiment of the invention as read in conjunction with the accompanying drawings in which:

FIGS. 1 and 2 are electrical schematic circuit, block diagrams illustrating a preferred embodiment of the present invention.

DESCRIPTION OF A PREFERRED EMBODIMENT

Figure 1:
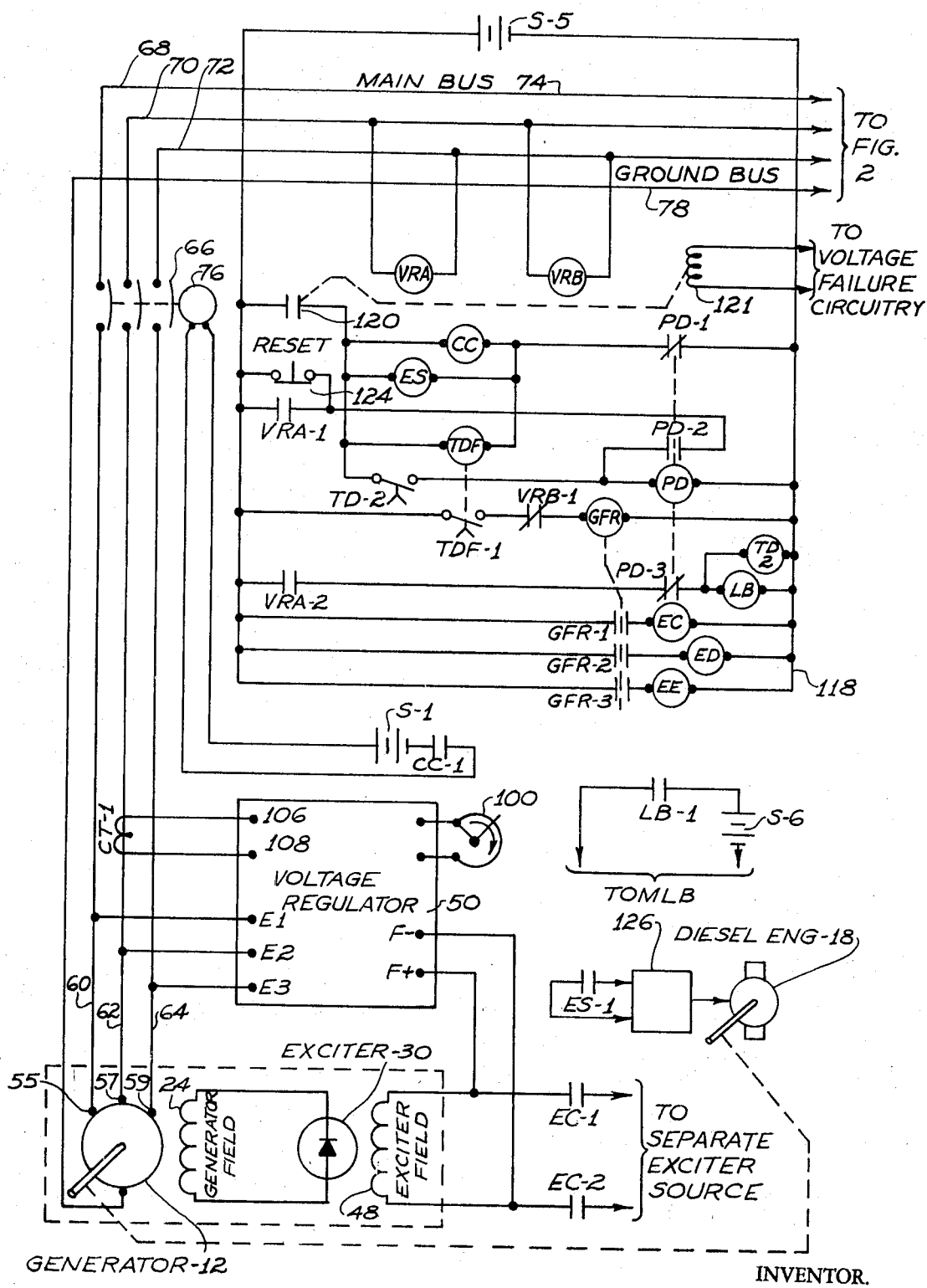

FIGS. 1 and 2 generally illustrate a power-generating system including a plurality of generators 12, 14, 16 which are respectively driven by a plurality of diesel engines 18, 20, 22. The generators 12, 14, 16 each include one of a plurality of generator fields 24, 26, 28, respectively.

The generator fields 24, 26, 28 are respectively supplied with an electrical signal from one of a plurality of exciters 30, 32, 34. The output terminals of exciter 30 are respectively coupled to the terminals of the generator field winding 24.

Similarly, the output terminals of exciter 32 are respectively coupled to the terminals of the generator field winding 26. In a like manner, the output terminals of the exciter 34 are respectively coupled to the terminals of the generator field winding 28.

The exciter 30 includes an exciter field winding 48. The terminals of the exciter field winding 48 are coupled through a pair of normally open relay contacts EC-1, EC-2, respectively, to the output terminals of a separate source of field excitation. This source of field excitation takes the form of a direct current voltage source, such as a storage battery supply. In addition, one of the terminals of the exciter field winding 48 is coupled to the positive "F" output terminal of a voltage regulator circuit 50, and the other terminal of the exciter field winding 48 is coupled to the negative "F" output terminal of the voltage regulator circuit 50.

Similarly, the exciter 32 includes an exciter field winding 52 having its terminals connected through a pair of normally open relay contacts ED-1, ED-2, respectively, to the separate source of excitation. In addition, one of the terminals of the exciter field winding 52 is connected to the positive "F" output terminal of a voltage regulator 54, and the other terminal of the exciter field winding 52 is coupled to the negative "F" output terminal of the voltage regulator 54. In a like manner, the exciter 34 includes an exciter field winding 56 having its output terminals connected through a pair of normally open relay contacts EE-1, EE-2, respectively, to the separate source of excitation. In addition, one of the terminals of the exciter field winding 56 is also connected to the positive "F" output terminal of a voltage regulator 58, and the other terminal of the exciter field winding 56 is connected to the negative "F" output terminal of the voltage regulator 58. The voltage regulator circuits 50, 54, 58 preferably take the form of a voltage regulator Model No. SR-4 manufactured by Basler Electric Company.

The generator 12 is a three-phase generator and includes three-phase terminals 55, 57, 59 which are respectively connected to three output conductors 60, 62, 64. The output conductors 60, 62, 64 are each connected through a triple-pole, single-throw circuit breaker 66 to the three phase lines 68, 70, 72 of the main bus 74. The circuit breaker 66 includes an actuator 76 having one terminal connected through a direct current voltage supply source S-1 and a pair of normally open relay contacts CC-1 to the other terminal of the actuator 76. The ground terminal of the generator 12 is connected directly to a ground bus 78.

Similarly, the phase terminals 75, 77, 79 of generator 14 are connected through three output conductors 80, 82, 84 and through the contacts of a triple-pole, single-throw circuit breaker 86 to the phase lines 68, 70, 72 of the main bus 74. The circuit breaker 86 similarly includes an actuator 88 having one terminal connected through a direct current voltage supply source S-2 and a pair of normally open relay contacts CC-2 to the other terminal of the actuator 88. The ground terminal of generator 14 is also connected directly to the ground bus 78.

In a like manner, the generator 16 includes three-phase terminals 85, 87, 89 which are coupled through three output conductors 90, 92, 94, and the contacts of a triple-pole, single-throw circuit breaker 96 to the phase lines 68, 70, 72 of the main bus 74. The circuit breaker 96 also includes an actuator 98 having one terminal connected through a direct current voltage supply source S-3 and a pair of normally open relay contacts CC-3 to the other terminal of the actuator 98. The ground terminal of generator 16 also is connected directly to the ground bus 78.

The voltage regulators 50, 54, 58 each include one of a plurality of manual voltage adjusting rheostats 100, 102, 104. The voltage regulator 50 also includes a compensating circuit for balancing the power supplied by the generators 12, 14, 16. The compensating circuit is coupled through a pair of terminals 106, 108 to current transformer CT-1. The current transformer CT-1 is inductively coupled to the output conductor 62 of generator 12, to thereby provide a signal to the voltage regulator 50 representative of the current flowing through conductor 62. Similarly, the voltage regulator 54 includes a compensating circuit having a pair of terminals 110, 112. Connected across the terminals 110, 112 is a current transformer CT-2. The transformer CT-2 is inductively coupled to the output conductor 82 of generator 14. In addition, the voltage regulator 58 includes a compensating circuit having a pair of terminals 114, 116. Connected across the terminals 114, 116 of voltage regulator 58 is a current transformer CT-3. The current transformer CT-3 is inductively coupled to the output conductor 92 of generator 16.

Each of the voltage regulators includes a plurality of input terminals E-1, E-2, E-3 for receiving a voltage signal from the output conductors of the generators 12, 14, 16. The input terminals E-1, E-2, E-3 of voltage regulator 50 are respectively coupled to the output conductors 60, 62, 64, respectively, of generator 12. Similarly, the input terminals E-1, E-2, E-3 of the voltage regulator 54 are respectively coupled to the output conductors 80, 82, 84 of the generator 14. In a like manner, the input terminals E-1, E-2, E-3 of the voltage regulator 58 are respectively coupled to the output conductors 90, 92, 94 of the generator 16.

A direct current voltage supply source S-5 provides the power for the generator control circuit 118. More particularly, connected across the supply source S-5, and in series connection with respect to each other, is a starting contact 120, a generator circuit breaker coil CC, and a pair of normally closed lockout relay contacts PD-1. An engine start relay coil ES is coupled in parallel with a flashing delay timer TDF across the terminals of the generator circuit breaker coil CC. Also connected across the supply source S-5 and in series with each other is normally closed reset switch 124, a pair of normally open lockout relay contacts PD-2, and the lockout relay coil PD.

A pair of normally open relay contacts VRA-1 are coupled in parallel with the reset switch 124. The relay contacts VRA-1 are actuated by a voltage sensitive relay coil VRA having its terminals connected across the phase lines 70, 72. Also connected across the voltage source S-5, and connected in series with each other, is a pair of normally open contacts TDF-1 of the flashing delay timer TDF, a pair of normally closed relay contacts VRB-1, and a flashing control relay coil GFR. The relay contacts VRB-1 are actuated by a voltage sensitive relay coil VRB which is connected across the phase line 70, 72.

Also connected across the voltage source S-5, and in series connection with each other, is a pair of normally open relay contacts VRA-2 actuated by the voltage sensitive relay coil VRA, a pair of normally closed relay contacts PD-3 actuated by the lockout relay coil PD, and a load breaker relay coil LB. Connected across and in parallel with the load breaker relay coil LB is a circuit breaker control timer TD-2. A pair of normally open relay contacts GFR-1, actuated by the flashing control relay coil GFR, are connected in series with a flashing relay coil EC across the supply source S-5. Similarly, a pair of normally open relay contacts GRF-2, actuated by the flashing control relay coil GFR, are connected in series with another flashing relay coil ED. These series connected elements are coupled across the supply source S-5. In addition, a pair of normally open relay contacts GFR-3, actuated by the flashing control relay coil GFR, are connected in series with a flashing relay coil EE. These series connected elements are also coupled across the supply source S-5.

The engine start relay control coil ES actuates the three pairs of relay contacts ES-1, ES-2, ES-3. The relay contacts ES-1, ES-2, ES-3 are respectively coupled to the engine start control circuits 126, 128, 130. These control circuits 126, 128, 130 include suitable circuitry for respectively starting the diesel engines 18, 20, 22 upon close of the relay contacts ES-1, ES-2, ES-3, respectively.

The load breaker relay coil LB actuates a pair of normally open relay contacts LB-1 which are coupled in series with a supply source S-6. The series connected elements are connected across the terminals of the actuator MLB of a load circuit breaker 132. The load circuit breaker 132 is a triple-pole, single-throw circuit breaker and, upon being actuated, electrically couples the phase lines 68, 70, 72 to the main voltage supply line.

Operation of the Power-Generating System 12,14,16, the

In order to start up the plurality of generators 12,14,16, the starting contact 120 is closed by a voltage failure relay coil 121 to thereby energize the generator circuit breaker relay coil CC and the engine start relay coil ES. While only three generators are illustrated in the preferred embodiment, it is readily apparent that any number of generators may be brought up to operating speed and synchronized with the addition of circuitry similar to that illustrated in FIG. 2. Upon energization of the generator circuit breaker relay coil CC, the relay contacts CC-1, CC-2, CC-3 close. The closure of contacts CC-1, CC-2, CC-3 causes the actuators 76, 88, 98 to become energized to thereby close the circuit breakers 66, 86, 96. When the circuit breakers 66, 86, 96 close, the generators 12, 14, 16 are coupled directly to the phase lines 68, 70, 72 of the main bus 74. Upon the energization of engine start relay coil ES, the relay contacts ES-1, ES-2, ES-3 close to thereby startup the diesel engines 18, 20, 22.

When the starting contact 120 is closed, the flashing delay timer TDF is also energized, and after a short time delay, such as two seconds, its contacts TDF-1 close thereby energizing the flashing control relay coil GFR. Upon the energization of relay coil GFR, the relay contacts GFR-1, GFR-2, GFR-3 close to thereby energize the flashing relay coils EC, ED, EE. When the coils EC, ED, EE are energized, their corresponding contacts EC-1, EC-2, ED-1, ED-2, EE-1, EE-2 close to thereby couple the exciter field windings 48, 52, 56 to the separate exciter source.

As the diesel engines 18, 20, 22 simultaneously start up, the rotors of the generators 12, 14, 16 simultaneously begin rotating. When the exciter field coils 48, 52, 56 are energized by the separate exciter source, signals are applied to the generator fields 24, 26, 28 thereby allowing the generators to commence supplying power to the main bus 74.

When the voltage developed by the generators 12, 14, 16 reaches a preselected operating level, the voltage sensing relay coils VRA, VRB become energized. Upon the energization of coil VRB, the normally closed relay contacts VRB-1 open to thereby deenergize the flashing control relay coil GFR. Upon deenergization of the relay coil GFR, the contacts GFR-1, GFR-2, GFR-3 open to thereby deenergize the flashing relay coils EC, ED, EE. when the relay coils EC, ED, EE, become deenergized, their corresponding relay contacts EC-1, EC-2, ED-1, ED-2, EE-1, EE-2, open thereby disconnecting the exciter fields 48, 52, 56 from the separate exciter source. The voltage regulators 50, 54, 58 are each responsive to the signals developed on the output conductors of the corresponding generator to thereby control the signals applied to the exciter fields 48, 52, 56. In order words, each of the voltage regulators 50, 54, 58 continuously monitor the voltage signals developed by the corresponding generator in order to develop an output signal having a value representative of the level of the generated signal. Each of the signals developed by the voltage regulators 50, 54, 58 are continuously applied to the corresponding exciter field winding in order to cause the generators to maintain identical speeds as the speed of the generators builds up to the normal operating speed.

The energization of voltage sensitive relay coil VRA causes relay contacts VRA-1, VRA-2 to close to thereby energize the load breaker control relay coil LB and the breaker control timer TD-2. Upon energization of the relay coil LB, the relay contacts LB-1 close to thereby energize the load breaker actuator MLB. When the actuator MLB becomes energized, the load breaker 132 closes to thereby couple the main bus 74, comprised of the phase line 68, 70, 72, to the main voltage supply line. The energization of the breaker control timer TD-2 causes, after a short delay, the relay contacts TD-2 to close thereby energizing the lockout relay coil PD.

Upon energization of the relay coil PD, the normally closed relay contacts PD-1 open, the normally open relay contacts PD-2 close, and the normally closed relay contacts PD-3 open. Upon closure of the contacts PD-2, the relay coil PD is maintained in an energized condition by the circuit including contacts PD-2 and contacts VRA-1. When the contacts PD-3 open, the load breaker coil LB and breaker control timer TD-2 are deenergized. Finally, when the contacts PD-1 open, the generator circuit breaker control coil CC, engine start control coil ES, and flashing delay timer TDF are deenergized.

Once the voltage developed on the main bus 74 has reached a normal operating level, the separate exciter source cannot be applied to the exciter field windings until the voltage developed by the main bus 74 decreases to allow the voltage sensitive relay coils VRA and VRB to become deenergized. Upon the deenergization of relay coils VRA, VRB, the reset switch 124 may be actuated to again reset the power generating system.

Thus, in the operation of the present power generating system, the output terminals of the generators 12, 14, 16 are simultaneously coupled to the main bus 74, the diesel engines 18, 20, 22 are simultaneously started, and the generator field windings 24, 26, 28 are simultaneously energized by the separate exciter source. As the signals developed by the generators 12, 14, 16 build up, the voltage regulators 50, 54, 58 begin controlling the signals applied to the generator field windings 24, 26, 28, and when the generated signals reach a predetermined level, the separate exciter source is disconnected from the generator fields 24, 26, 28. Finally, the main bus 74 is coupled to the voltage supply line thereby completing the startup of the power generating system.

In view of the fact that the generators are simultaneously started and are synchronized by the voltage regulators 50, 54, 58 from the moment the generators commence generating power, the generators are in synchronization when normal operating power is attained.

Although the invention has been shown in connection with a preferred embodiment, it will be readily apparent to those skilled in the art that various changes in form and arrangement of parts may be made to suit requirements without departing from the spirit and scope of the invention as defined by the appended claims.

Having thus described my invention, I claim:

1. A power-generating system comprising:
 a plurality of engine driven electrical generators each having a field winding;
 a common busline;
 a plurality of actuatable switching means each for, upon actuation, electrically connecting a corresponding one of said plurality of generators to said common bus line;
 means for substantially simultaneously actuating each of said plurality of actuatable switching means so that each of said plurality of generators are substantially simultaneously connected to said common busline;
 a plurality of engines each coupled to a corresponding one of said plurality of generators to thereby drive the corresponding one of said plurality of generators;
 means for substantially simultaneously starting each of said plurality of engines to thereby substantially simultaneously apply motive power to each of said plurality of generators;
 a plurality of first actuatable circuit means each having a first position for coupling a corresponding generator field winding to a source of excitation and a second position for decoupling a corresponding field winding from a said source of excitation;
 a plurality voltage regulator means each for monitoring the value of a signal developed by a corresponding generator and including circuit means for developing an output signal having a value representative of a said monitored signal, each said voltage regulator circuit means being coupled to a corresponding generator field winding; and, second actuatable circuit means for, upon actuation, coupling said common busline to said voltage supply line to thereby energize said voltage supply line.

2. A power-generating system as defined in claim 1 including a source of excitation coupled to said second circuit means, said source of excitation comprising direct current storage batteries.

3. A power-generating system as defined in claim 1 including detection circuit means for monitoring a generated signal and having circuit means for actuating said first actuatable circuit means from a said first position to a said second position when a said generated signal attains a predetermined value.

4. A power-generating system as defined in claim 1 wherein said engine-starting means includes a plurality of switching means each for, upon actuation, starting a corresponding one of said engines; and, means for substantially simultaneously actuating each of said plurality of switching means.

5. A method of operating a power-generating system including a plurality of engine-driven, power generators each including a control winding, and a control system having a voltage regulator means for each said generator, comprising the steps of:

substantially simultaneously starting each of said plurality of engines to thereby substantially simultaneously apply motive power to each of said plurality of generators;

energizing the control windings of each of said plurality of generators with a field excitation source; and, applying a control signal developed by each of said voltage regulators to a corresponding control winding of one of said plurality of generators.

6. A method as defined in claim 5 including the step of electrically disconnecting a said field excitation source from each said field winding.

7. A method as defined in claim 6 including the step of electrically connecting said common busline to a main voltage supply line to thereby energize said supply line.

8. A method of operating a power-generating system including a plurality of engine-driven, power generators each including a control winding, and a control system having a voltage regulator means for each said generator, comprising the steps of:

substantially simultaneously electrically connecting the output terminals of each of said plurality of generators to a common busline;

substantially simultaneously starting each of said plurality of engines to thereby substantially simultaneously apply motive power to each of said plurality of generators;

energizing the control windings of each of said plurality of generators with a field excitation source; and, applying a control signal developed by each of said voltage regulators to a corresponding control winding of one of said plurality of generators.

9. A method as defined in claim 8 including the step of electrically disconnecting a said field excitation source from each said field winding.

10. A method as defined in claim 9 including the step of electrically connecting said common busline to a main voltage supply line to thereby energize said supply line.

11. A control system for starting up a plurality of engine-driven electrical generators and comprising:

a common busline;

first circuit means for electrically coupling said plurality of generators to said common busline;

actuatable means for substantially simultaneously starting a plurality of engines to thereby substantially simultaneously apply motive power to a plurality of generators;

second circuit means for applying a source of excitation to a plurality of electrical generators; and, voltage regulator means for monitoring the value of a generated signal and including circuit means for developing an output signal having a value representative of a said monitored signal, said voltage regulator circuit means being adapted to be electrically coupled to at least one of said plurality of generators.

12. A control system as defined in claim 11 including a source of excitation coupled to said second circuit means, said source of excitation comprising direct current storage batteries.

13. A power-generating system as defined in claim 11 wherein said first circuit means includes a plurality of actuatable switching means each for, upon actuation, electrically coupling a corresponding one of said plurality of generators to said common busline.

14. A power-generating system as defined in claim 13 wherein said first circuit means includes means for substantially simultaneously actuating each of said plurality of switching means to thereby substantially simultaneously coupling each of said generators to said common busline.

15. A power-generating system comprising:

a plurality of electrical generators each having a control winding;

a common busline;

first circuit means for electrically coupling each of said electrical generators to said common busline;

means for substantially simultaneously applying motive power to each of said generators;

said circuit means for coupling a source of excitation to each said control winding of said plurality of generators; and, signal regulator means for monitoring a generated signal and including circuit means for developing a signal representative of a said monitored signal, said voltage regulator circuit means being coupled to said control windings of each of said plurality of generators.

16. A power-generating system as defined in claim 15 wherein said motive power means is a plurality of engines each for driving a corresponding one of said plurality of generators; and, third circuit means for, upon actuation, substantially simultaneously starting each said plurality of generators to thereby substantially simultaneously applying motive power to each said plurality of generators.

17. A power-generating system as defined in claim 16 including a source of excitation coupled to said second circuit means, said source of excitation comprising direct current storage batteries.

18. A power-generating system as defined in claim 16 wherein said first circuit means includes a plurality of actuatable switching means each for, upon actuation, electrically coupling a corresponding one of said plurality of generators to said common busline.

19. A power-generating system as defined in claim 18 wherein said first circuit means includes means for substantially simultaneously actuating each of said plurality of switching means to thereby substantially simultaneously coupling each said generators to said common busline.

20. A power-generating system as defined in claim 16 wherein said signal regulator means comprises a plurality of voltage regulator means, each one of said plurality of voltage regulator means having an input circuit coupled to a corresponding generator for monitoring a generated signal and an output circuit for developing a signal having a value representative of a said monitored signal, each said output circuit means being coupled to a corresponding one of said control windings of said electrical generators to thereby vary a signal applied to the corresponding control winding in response to a corresponding generated signal.

* * * * *